B. C. POSTON.
BALING PRESS.
APPLICATION FILED APR. 5, 1911.

1,017,168.

Patented Feb. 13, 1912.

2 SHEETS—SHEET 1.

UNITED STATES PATENT OFFICE.

BURTON CALVIN POSTON, OF CHILLICOTHE, OHIO.

BALING-PRESS.

1,017,168. Specification of Letters Patent. Patented Feb. 13, 1912.

Application filed April 5, 1911. Serial No. 619,149.

*To all whom it may concern:*

Be it known that I, BURTON C. POSTON, citizen of the United States, residing at Chillicothe, in the county of Ross and State of Ohio, have invented certain new and useful Improvements in Baling - Presses, of which the following is a specification, reference being had therein to the accompanying drawing.

This invention relates to improvements in baling presses, the object of which is to provide an improved mechanism for operating the pressing platform or follower, and an improved bale case, all of which will be fully illustrated and described hereinafter.

Figure 1:
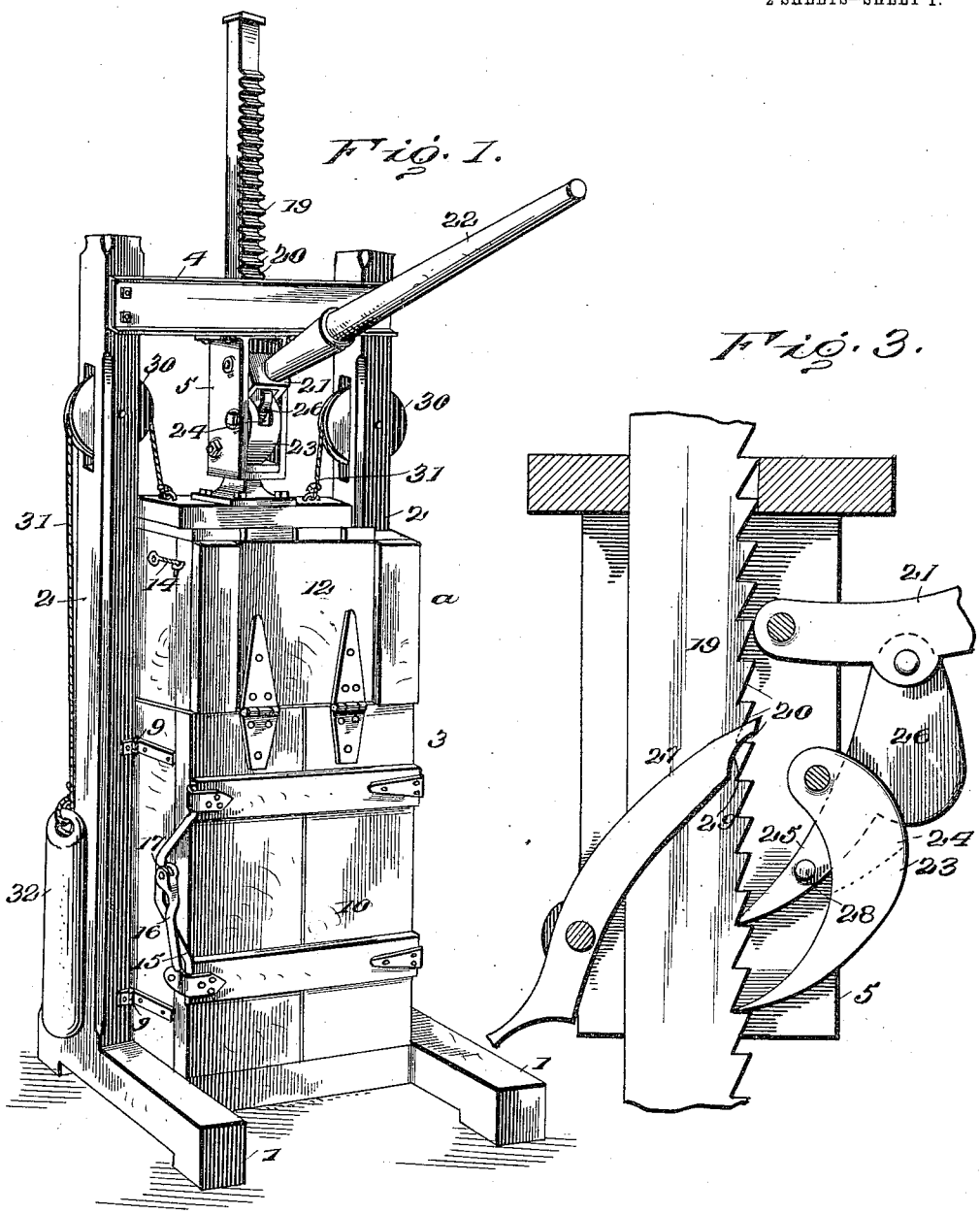
Figure 2:
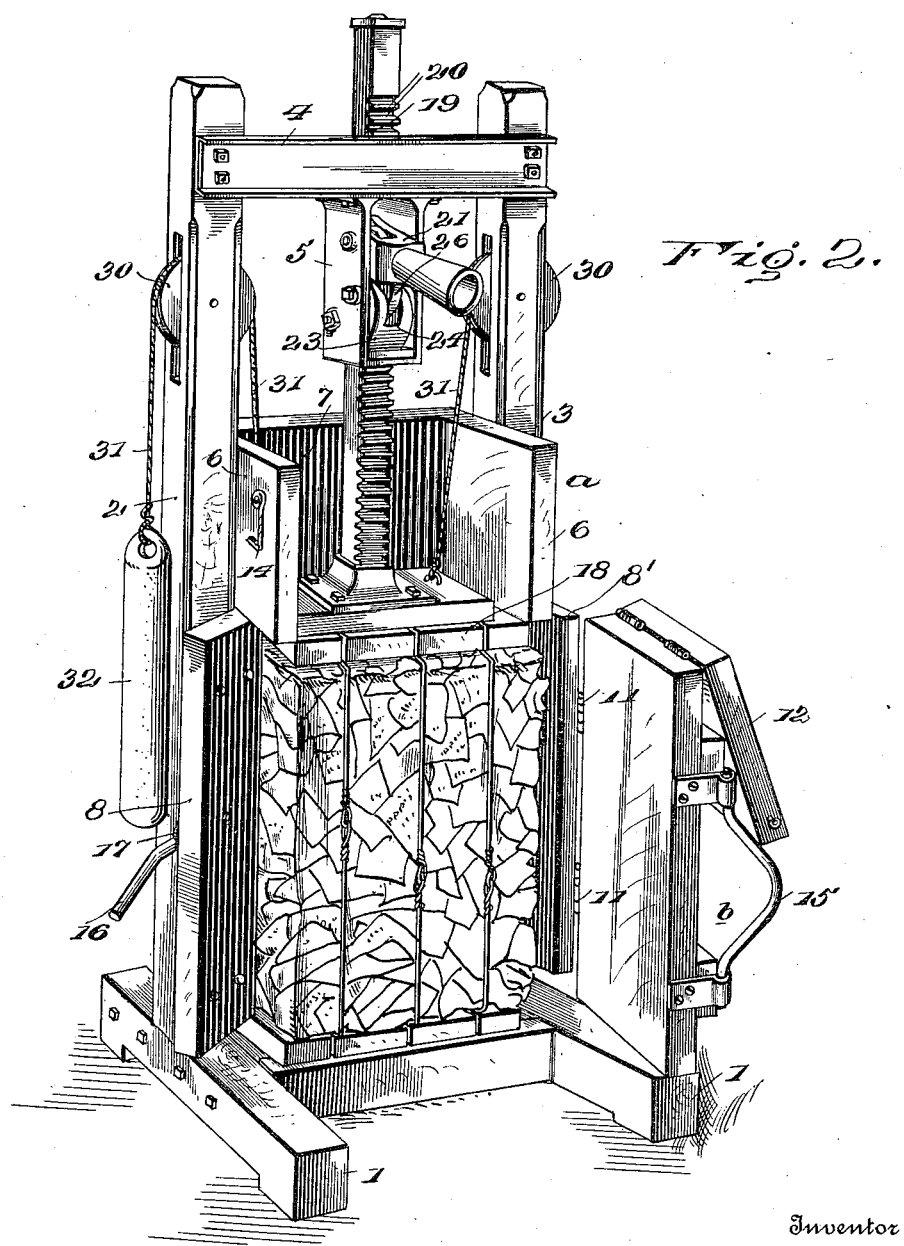

In the accompanying drawings—Figure 1 is a perspective view of my improved press, showing the bale case closed. Fig. 2 is a perspective view of the improved press, showing the follower depressed; the bale case open and the bale material in position thereon. Fig. 3 is a detached sectional view showing the mechanism for depressing and releasing the follower, or pressing platform.

Referring now to the drawings, 1 is a suitable base from opposite sides of which project two vertical standards 2, and between these standards the bale case 3 is located. The upper ends of the standards 2 are connected by transverse channel bars 4, and depending from the under sides of these channel bars and suitably bolted thereto is a housing 5 for the lever operating mechanism by means of which the pressing is accomplished.

The construction of the bale case will be first described, and this comprises an upper portion $a$ and a lower portion $b$. This upper portion $a$ has the rigid side walls 6 and the rigid rear wall 7 forming essentially a rigid U-shaped upper portion. The lower portion $b$ of the case has its front side provided with side doors 8 and 8', which are hinged to the posts or standards 2, at the points 9. The front of this lower portion $b$ consists of a door 10, which is hinged to one of the hinged side doors 8 at 11, and to the upper edge of the door 10 a door 12 is hinged at its lower edge, and this door 12 serves to close the front of the upper portion $a$, as shown in Fig. 1, and when closed is secured in position by suitable fastenings 14.

The free edge of the door 10 is provided with a swinging U-shaped fastening bar 15 and the side door 8 is provided with an eccentric fastening lever 16 having its eccentric end grooved, as shown at 17 to fit the hinged bar 15, as clearly shown in Fig. 1, and serves to hold the side doors 8, and 8' and the front door 10 closed during the pressing operation.

By means of this construction when the lower portion of the bale press is opened, as shown in Fig. 2, the front of the upper portion is also opened and this arrangement of the doors by opening the sides of the lower portion of the bale casing enables the bale to be readily and quickly removed therefrom.

A suitable follower or pressing platform 18, fits within the bale case, as shown in Fig. 2, and has a central upwardly projecting rack-bar 19, having teeth 20 on its front edge. Pivoted in the upper portion of the housing 5 is an operating head 21, adapted to receive an operating handle 22, the handle being removed therefrom when the press is not in operation, so that it will not be in the way. A holding dog 23 is pivoted in the housing 5 and the pivotal end of this dog is bifurcated to form a slot 24. The shape of this dog 23 is such that its lower toothed end is automatically held in contact with the teeth of the rack bar 19 by gravity. An operating dog 25 is pivoted to the lever head 21, and its inner end passing through the slot 24 in the holding dog 23, and by reason of an enlargement 26 the free end of the dog is automatically held in contact with the teeth 20 of the rack-bar by gravity.

A releasing latch 27 is pivoted in the housing at the opposite side thereof from the said dogs and has its inner end suitably-shaped to engage a lug 28, which projects from the side of the inner end of the dog 25. As here shown this shape is in the form of a notch 29. In Fig. 3 the releasing latch 27 is shown out of operative position.

Rollers or sheaves 30 are journaled in the upper portions of the standards 2 and cords or cables 31 have their inner ends attached to the follower 18, pass around the said sheaves and carry suitable weights 32, which are sufficient to normally raise the follower and hold it in the position shown in Fig. 1.

The operation of this mechanism is as follows: With the parts in the positions shown in Fig. 3, the holding dog 23 and the operating dog 25 are in contact with the teeth of the rack-bar 19. A downward movement on the operating lever 22 depresses the follower head one or more notches, and the holding dog 23 catches the teeth of the rack-bar and holds the follower in its depressed position. The repeated up and down movement of the operating lever 22 will force the follower the desired distance downward to put the bale under the desired pressure and compress it to the desired size. The doors are opened and the bale is then secured or fastened by baling bands in the usual manner. By releasing the cam-lever 16 and releasing the fastenings 14, the doors 10, 12, 8 and 8' are thrown open, as shown in Fig. 2. The releasing latch 27 is then thrown inward so that its inner edge will engage the lug 28. A downward pressure on the operating lever will cause this releasing dog to force the operating dog 25 out of engagement with the rack-bar and by continued downward movement the releasing dog will come in contact with the holding dog 23 and force it out of engagement with the rack-bar, thus releasing both dogs from the rack bar at which time the weights 32 will lift the follower and the bale can be readily and quickly removed from the press.

Having thus described my invention, what I claim and desire to secure by Letters Patent is—

1. A pressing mechanism comprising a vertically movable follower, a vertically movable rack-bar projecting from the follower, a housing through which the rack-bar passes, an operating lever having its inner end pivoted to the housing, a holding dog pivoted in the housing below the pivoted end of the lever and normally engaging the rack-bar, the holding dog having an intermediate slot, an operating dog pivoted to the lever and depending through the said slot and normally engaging the rack-bar, substantially as described.

2. A pressing mechanism comprising a follower, a rack-bar projecting therefrom, a stationary housing through which the rack-bar passes, an operating lever having its inner end pivoted in the housing, a holding dog pivoted in the housing and provided with a slot adjacent its pivoted end, an operating dog pivoted to the operating handle and projecting through the slot, said dog normally engaging the rack and a releasing dog adapted to engage the operating dog and force it out of engagement with the rack-bar, the operating dog in turn adapted to engage the holding dog and force it out of engagement with the rack bar for the purpose described.

3. A pressing mechanism comprising a follower, a rack bar projecting therefrom, a housing through which the rack bar projects, an operating lever pivoted at its inner end in the said housing, a holding dog normally engaging the rack-bar, an operating dog normally engaging the rack-bar, the operating dog constructed to engage the holding dog when it is forced out, and means for forcing the operating dog outward when the lever is depressed for the purpose of releasing the toothed dogs from the rack-bar.

4. A compressing mechanism comprising a follower, a rack-bar projecting therefrom, a stationary housing through which the rack-bar passes, an operating lever pivoted at its inner end to said housing, a holding dog pivoted in the housing and normally engaging the rack-bar, the holding dog having a slot through its pivotal end, an operating dog pivoted to the operating handle and extending through the slot of the holding dog and normally engaging the rack-bar, the inner end of the operating dog having a projection adapted to engage the holding dog for the purpose described, and a pivoted lever adapted to have its inner end engage the operating dog for forcing it away from the rack-bar and the projection thereon in contact with the holding dog to force it out of engagement with the rack bar when the operating handle is depressed.

5. A press comprising a bale casing, standards projecting thereabove, a cross-bar connecting the upper ends of the standards, a vertically arranged housing carried by and projecting from the cross-bar, a follower in the bale casing, a rack-bar projecting upward from the follower and passing through the housing, an operating lever pivoted in the housing, a holding dog pivoted in the housing below the operating lever, and an operating dog connected to the lever, both dogs normally in engagement with the rack-bar, the parts operating as described.

6. A baling press comprising a bale casing, standards projecting upwardly therefrom, a housing connected with the standards, a follower in the bale casing, a rack-bar projecting upward from the follower and passing through the housing, an operating lever pivoted in the housing, a holding dog pivoted in the housing below the operating lever, an operating dog pivoted to the lever, said dogs normally in engagement with the rack-bar, and means for forcing the dogs out of engagement with the rack-bar through the downward movement of the operating dog.

7. A baling press, comprising a bale casing having upper and lower portions, the lower portion having a rigid back and rigid side portions extending about half the horizontal depth thereof, vertically arranged side doors hinged to the outer edges of the said rigid sides and forming hinged front side doors for and completing the side walls of the lower portion, a door hinged to the outer edge of one of the hinged front side doors to form the front wall of the lower portion, and a hinged outer wall for the upper portion.

8. A baling press comprising a bale casing, a follower in the bale casing, a rack bar projecting from the follower, a pivoted operating lever, a holding dog adapted to engage the rack, an operating dog pivotally connected to the lever and adapted to engage the rack, and means actuated by the downward movement of said moving parts for forcing both of said dogs out of engagement with the rack bar.

9. A baling press comprising a bale casing, a follower therein, a rack bar projecting from said follower, a pivoted operating lever, an operating dog connected to the lever and adapted to engage the rack bar, a holding dog adapted to engage said rack bar and means actuated by the movement of the said lever for forcing both of said dogs out of engagement with the rack bar.

In testimony whereof I hereunto affix my signature in the presence of two witnesses.

BURTON CALVIN POSTON.

Witnesses:
CHAS. E. CAPPLE,
E. W. DICKEMAN.

Copies of this patent may be obtained for five cents each, by addressing the "Commissioner of Patents, Washington, D. C."